(12) United States Patent
Huang

(10) Patent No.: US 10,931,584 B2
(45) Date of Patent: Feb. 23, 2021

(54) DATA FRAME TRANSMISSION

(71) Applicant: Hewlett Packard Enterprise Development LP, Houston, TX (US)

(72) Inventor: Wei Huang, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/543,667

(22) Filed: Aug. 19, 2019

(65) Prior Publication Data

US 2020/0067840 A1 Feb. 27, 2020

(30) Foreign Application Priority Data

Aug. 23, 2018 (CN) .......................... 201810966460.8

(51) Int. Cl.
*H04L 12/801* (2013.01)
*H04L 12/851* (2013.01)

(52) U.S. Cl.
CPC .............. *H04L 47/14* (2013.01); *H04L 47/16* (2013.01); *H04L 47/24* (2013.01)

(58) Field of Classification Search
None
See application file for complete search history.

(56) References Cited

U.S. PATENT DOCUMENTS

| 7,180,896 B1* | 2/2007 | Okumura | H04L 1/1628 370/394 |
| 8,339,948 B2 | 12/2012 | Ramprashad et al. | |
| 9,185,045 B1* | 11/2015 | Yang | H04L 47/34 |
| 2003/0035420 A1* | 2/2003 | Niu | H04L 69/165 370/389 |
| 2007/0110074 A1* | 5/2007 | Bradley | H04L 65/601 370/395.51 |
| 2013/0070584 A1* | 3/2013 | Hutchison | G06F 11/3058 370/216 |
| 2013/0083203 A1* | 4/2013 | Barrett | H04N 17/004 348/180 |
| 2013/0114606 A1* | 5/2013 | Schrum, Jr. | H04L 47/125 370/395.53 |
| 2016/0323062 A1* | 11/2016 | Yang | H04L 47/34 |

FOREIGN PATENT DOCUMENTS

WO     WO-2018009468     1/2018

OTHER PUBLICATIONS

Gualdi, G. et al., Video Streaming for Mobile Video Surveillance, (Research Paper), Oct. 2008, IEEE Transactions on Multimedia, vol. 10, No. 6, 13 Pgs.
Latency in Live Network Video Surveillance, (White Paper), Retrieved Jul. 2, 2018, 12 Pgs.
Next-Generation Wireless Mesh Networks, (White Paper), Mar. 2011, 14 Pgs.
The Next Step in the Evolution of Tireless Mesh Networking, (White Paper), Aug. 2010, 16 Pgs.

* cited by examiner

*Primary Examiner* — Khaled M Kassim
(74) *Attorney, Agent, or Firm* — Hewlett Packard Enterprise Patent Department

(57) ABSTRACT

The present application relates to data frame transmission. An network device comprising a processor to receive data frames tagged with at least timestamps and sequence numbers; buffer the received data frames for a time threshold; order the buffered data frames based on the sequence numbers; and forward the ordered data frames to a client device based on the timestamps, in response to elapse of the time threshold.

3 Claims, 9 Drawing Sheets ns according to the present disclosure.
DATA FRAME TRANSMISSION

BACKGROUND

In a wireless system, some applications may use data frame transmission technology. Due to some inherent natures of wireless network, these applications may suffer from packet loss, packet jitter and/or out-of-order delivery.

DETAILED DESCRIPTION

Figure 1:
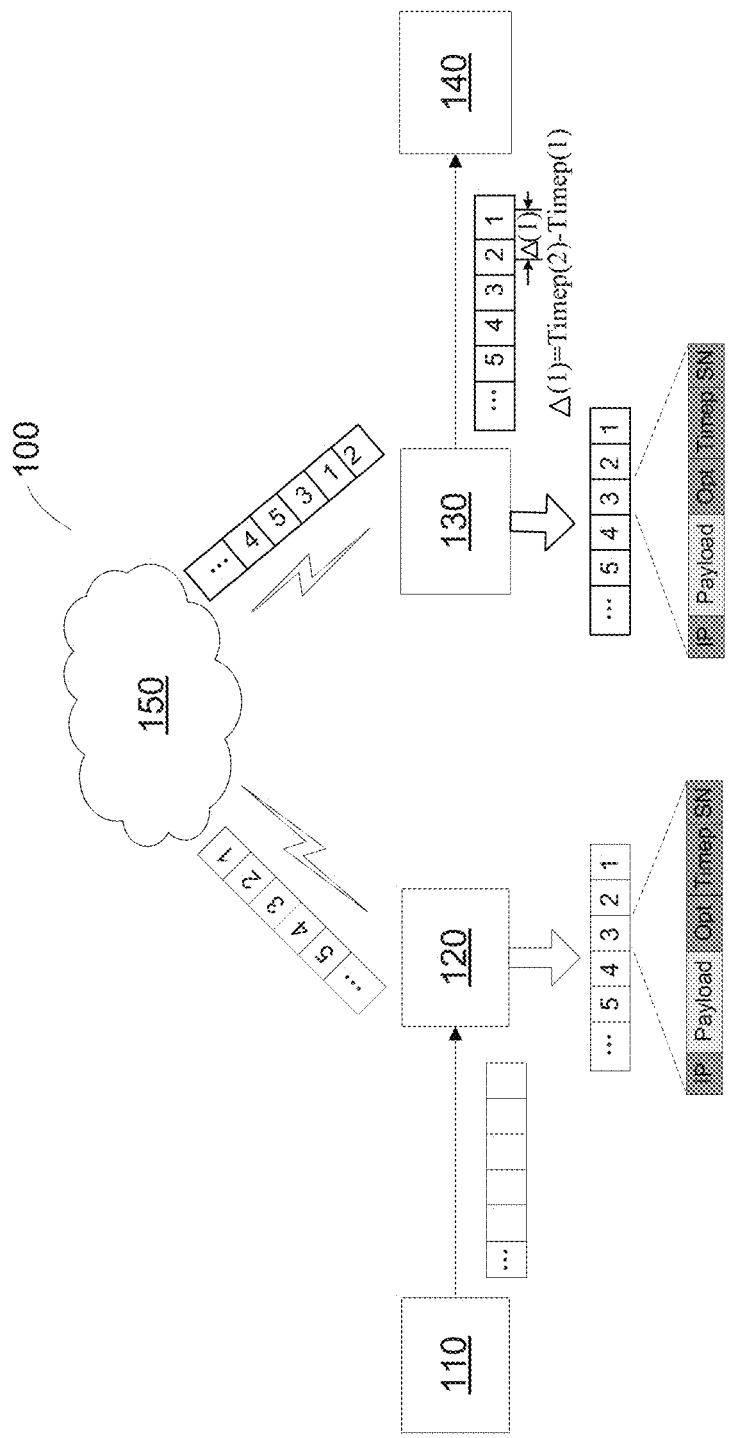
FIG. 1 is a block diagram illustrating an example system for data frame transmission according to the present disclosure.

In a wireless system, applications such as video streaming, IPTV, high-definition stationary and mobile video surveillance, may use data frame transmission technology. Due to some inherent natures of wireless network, however, such applications may suffer from packet loss, packet jitter and/or out-of-order delivery, resulting in reduced quality of data frame transmission and poor user experience. Further, in multi-hop wireless networks like wireless mesh networks, since data frames go through multiple wireless links to reach the a client device, the quality of data frame transmission may be worse and user experience may be poorer.

TCP is a transport protocol that may implement packets retransmission to address packet loss issue. Although TOP may preserve a reliable transportation, it usually results in a large latency between two sides of a system for data frame transmission, and it may fail to address packet jitter issue.

According to sensitivity of time, it is possible to classify the networked applications into three categories: (i) non-real-time transport like web browsing, bulk downloading; (ii) soft real-time transport like video; and (iii) hard real-time transport like VoIP, real-time control. Under some circumstances, applications using data frame transmission technology may be soft real-time, which is real-time but may tolerate some small amount of delay.

According to the characteristic of such applications, transmission characters may be used. Data frames may be tagged with transmission characters and buffered in the network, and then in-network lost packet retransmission, jitter removal and packet reordering may be performed based on the transmission characters. One example of such technology may be active video transport (ACT), which tradeoffs end-to-end delay increase for reliable, stable transport over wireless network.

Specifically, the data frames may be tagged with transmission characters, such as sequence numbers and timestamps. In a client end, the tagged data frames may be received and buffered for a time threshold. The time threshold may be an additional latency for a relatively reliable transmission. During the period of buffering, a processor of an egress network device may request an ingress network device to retransmit one or more lost packets, and order the data frames based on their sequence numbers. In this manner, the issues of packet loss and out-of-order delivery may be improved. In addition, the processor of the egress network device may forward the ordered data frames based on their timestamps, in response to elapse of the time threshold. In this manner, packet jitter may be improved.

In one example, a device comprising a processor to: receive data frames tagged with at least timestamps and sequence numbers, buffer the received data frames for a time threshold, order the buffered data frames based on the sequence numbers, and forward the ordered data frames to a client device based on the timestamps, in response to elapse of the time threshold.

In another example, a method comprising: receiving, by a processor of a network device, data frames tagged with at least timestamps and sequence numbers, buffering, by the processor, the received data frames for a time threshold, ordering, by the processor, the buffered data frames based on the sequence numbers, and forwarding, by the processor, the ordered data frames to a client device based on the timestamps, in response to elapse of the time threshold.

In another example, a non-transitory computer readable storage medium stores instructions that, when executed by a processor of a network device, causes the processor to: receive data frames tagged with at least timestamps and sequence numbers, buffer the received data frames for a time threshold, order the buffered data frames based on the sequence numbers, and forward the ordered data frames to a client device based on the timestamps, in response to elapse of the time threshold.

As used herein, a "network device" generally includes a device that is adapted to transmit and/or receive signaling and to process information within such signaling and to provide wireless local area network services to a station (e.g., any data processing equipment such as a computer, cellular phone, personal digital assistant, tablet devices, etc.). The "network device" may include access points, data transfer devices, network switches, routers, controllers, etc.

It is appreciated that examples described herein below may include various components and features. Some of the components and features may be removed and/or modified without departing from a scope of the device, method and non-transitory computer readable storage medium for. It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example. As used herein, a component is a combination of hardware and software executing on that hardware to provide a given functionality.

FIG. 1 is a block diagram illustrating an example system for data frame transmission according to the present disclosure. Referring to FIG. 1, an example system 100 for data frame transmission includes a data acquisition device 110, an ingress network device 120, an egress network device 130 and a client device 140. The ingress network device 120 communicates with the egress network device 130 over a multi-hop wireless network 150, such as a mesh network.

The client device 140 may be a smartphone, a mobile phone, a Personal Digital Assistant (PDA), a portable personal computer, an AIO (all-in-one) computing device, a notebook, a convertible or hybrid notebook, a netbook, a tablet, a cellular device, a desktop computer, a multimedia player, an entertainment unit, a data communication device, a portable reading device, or any other computing device capable of receiving data frames over wireless or wired connection and displaying and/or storing the received data frames. In the example system shown in FIG. 1, the client device 140 is connected to the egress network device over a wired connection.

It is appreciated that, the numbers of components shown in FIG. 1 are only illustrative, and the system for data frame transmission may include any numbers of the components. For example, the system for data frame transmission may include two or more ingress network devices 120 and/or two or more egress network devices 130.

The data acquisition device 110 may collect data and encode the data for transmission. In some examples, the data acquisition device 110 is connected to the ingress network device 120 over a wired connection. Upon receipt of the data frames from the data acquisition device 110, the ingress network device 120 may tag the received data frames with at least sequence numbers and timestamps. After tagging the data frames, the ingress network device 120 may buffer the tagged data frames and transmit them to the egress network device 130 over the multi-hop wireless network 150.

The egress network device 130 may receive data frames tagged with at least timestamps and sequence numbers, buffer the received data frames for a time threshold, order the buffered data frames based on the sequence numbers, and forward the ordered data frames to a client device based on the timestamps, in response to elapse of the time threshold.

In some examples, the egress network device 130 may determine time intervals between two adjacent ordered data frames based on their timestamps, and forward the ordered data frames to the client device 140 based on the time intervals. In other examples, the egress network device 130 may forward the ordered data frames to a client device according to any regular schedule, based on the timestamps.

As shown in FIG. 1, a tagged data frame may include, but without limitation, an Internet Protocol (IP) number, such as an Internet protocol 221, a payload, and a frame header. The frame header may include, but without limitation, a sequence number (SN), a timestamp (Timep), and other options (opt).

It is understood that, a sequence number and a timestamp are examples of transmission characters, and the data frames may be tagged with any other transmission characters that can identifying the sequences and time relationships among the data frames, without departing from the scope and sprit of the present disclosure.

Figure 2:
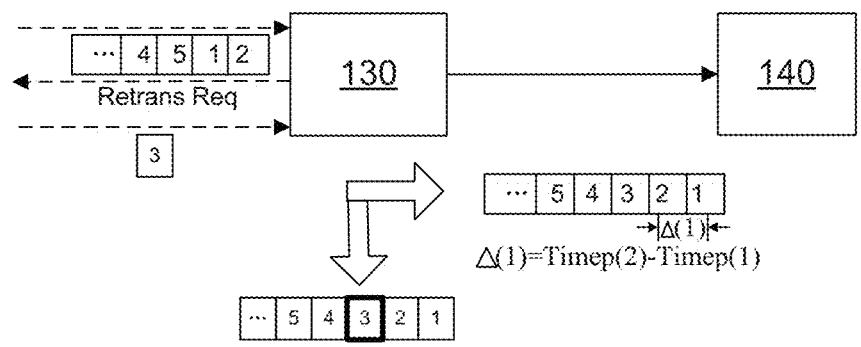
FIG. 2 is a diagram illustrating an example case of data frame transmission according to the present disclosure.

FIG. 2 is a diagram illustrating an example case of data frame transmission according to the present disclosure. In the example shown in FIG. 2, a processor of the egress network device 130 may receive data frames tagged with at least timestamps and sequence numbers, buffer the received data frames for a time threshold, and order the buffered data frames based on the sequence numbers.

In this example, after ordering the buffered data frames, the processor of the egress network device 130 may further send a retransmission request in response to a detection of a lost data frame (for example, data frame 3, as shown in FIG. 2). The retransmission request may contain a sequence number of the lost data frame and/or any other suitable information that can identify the lost data frame. In response to receiving the retransmission request, the ingress network device 120 may retrieve the buffered data frames and retransmit the requested data frame. The processor of the egress network device 130 may receive the retransmitted data frame, buffer the retransmitted data frame in response to receiving the retransmitted data frame within the time threshold, and reorder the buffered data frames.

In response to elapse of the time threshold, the processor of the egress network device 130 may forward the reordered data frames to a client device based on the timestamps.

In some examples, the egress network device 130 may determine time intervals between two adjacent reordered data frames based on their timestamps, and forward the reordered data frames based on the time intervals. In other examples, the egress network device 130 may forward the reordered data frames to a client device according to any regular schedule, based on the timestamps.

Figure 3:
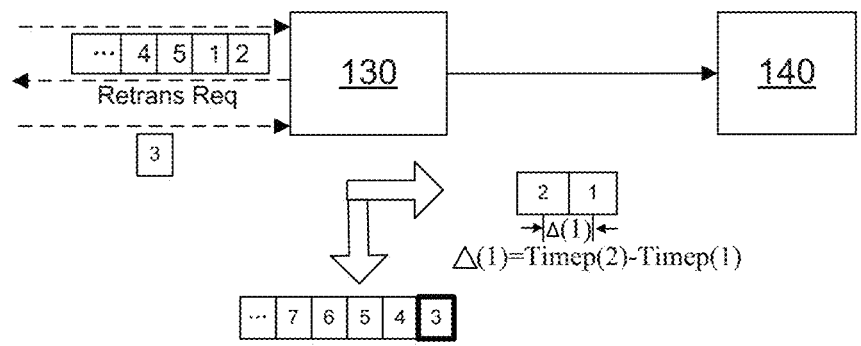
FIG. 3 is a diagram illustrating another example case of data frame transmission according to the present disclosure.

FIG. 3 is a diagram illustrating another example case of data frame transmission according to the present disclosure. In the example shown in FIG. 3, a processor of the egress network device 130 may receive data frames tagged with at least timestamps and sequence numbers, buffer the received data frames for a time threshold, and order the buffered data frames based on the sequence numbers.

In this example, the processor of the egress network device 130 may send a retransmission request in response to a detection of a lost data frame (for example, data frame 3, as shown in FIG. 3), and then forward the ordered data frames to a client device based on the timestamps, in response to the time threshold elapses.

The processor of the egress network device 130 may receive the retransmitted data frame, and buffer or discard the retransmitted data frame according to whether the data frame immediately following the retransmitted data frame in sequence has been forwarded. For example, in an example where the retransmitted data frame is received after the initiation of forwarding, the egress network device 130 may determine whether the data frame immediately following the retransmitted data frame in sequence has been forwarded. If the data frame immediately following the retransmitted data frame in sequence has not been forwarded (the instance shown in FIG. 3), the processor of the egress network device 130 may buffer the retransmitted data frame, reorder the buffered data frames and continue to forward the reordered data frames. If the data frame immediately following the retransmitted data frame in sequence has been forwarded (not shown), the processor of the egress network device 130 may discard the retransmitted data frame, and continue to forward the ordered data frames to the client device based on the timestamps.

In some examples, the processor of the egress network device 130 may determine time intervals between two adjacent data frames, and forward the ordered/reordered data frames based on the time intervals. In other examples, the processor of the egress network device 130 may forward the ordered data frames to a client device according to any regular schedule, based on the timestamps.

In the instance shown in FIG. 3, the retransmitted data frame may or may not be forwarded to the client device based on its timestamp. In an example, the retransmitted data frame may be forwarded to the client device based on its timestamps in response to the time corresponding to a difference between timestamps of the retransmitted data frame and its immediately preceding data frame since the immediately preceding data frame was forwarded does not elapse. Otherwise, the retransmitted data frame may be forwarded to the client device once it is reordered. For example, in an instance where data frame 3 losses, data frame 2 has been forwarded at $30^{th}$ millisecond and data frame 4 is scheduled to be forwarded at $90^{th}$ millisecond based on a difference between the timestamps thereof, if the retransmitted data frame 3 is received at the egress network device at $50^{th}$ millisecond, and the time corresponding to an difference between timestamps of data frames 2 and 3 (for example, 30 milliseconds) does not elapse, the data frame 3 may be forwarded to the client device at $60^{th}$ millisecond. In another instance, if data frame 3 is received at $70^{th}$ millisecond, data frame 3 may be forwarded to the client device once it is reordered. In either of the instances, the other reordered data frames may be forwarded based on still their timestamps. For example, data frame 4 may be forwarded still at $90^{th}$ millisecond.

Figure 4:
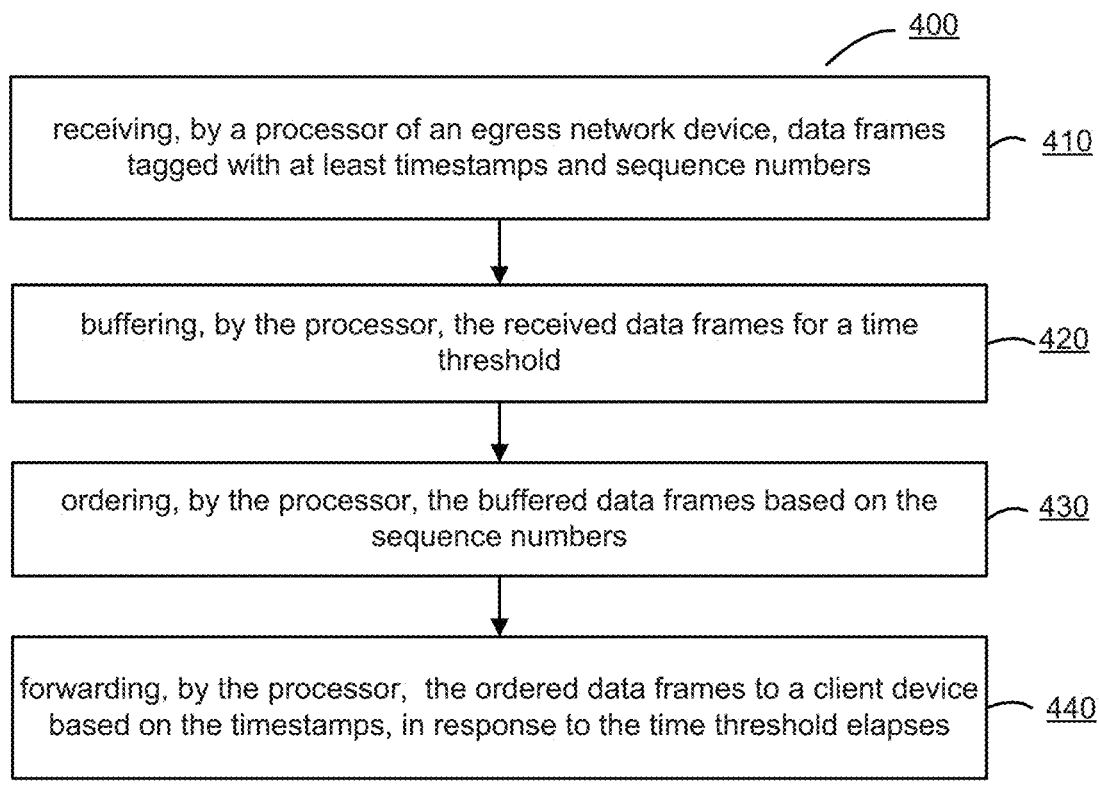
FIG. 4 is a flow chart illustrating an example method of data frame transmission according to the present disclosure.

FIG. 4 is a flow chart illustrating an example method 400 of data frame transmission according to the present disclosure. Referring to FIG. 4, the example method 400 may comprise receiving, by a processor of the egress network device, data frames tagged with at least timestamps and sequence numbers, at 410.

As described above, a sequence number and a timestamp are examples of transmission characters, and the data frames may be tagged with any other transmission characters that can identifying the sequences and time relationships among the data frames, without departing from the scope and sprit of the present disclosure.

The example method 400 may comprise buffering, by the processor, the received data frames for a time threshold, at 420.

The time threshold may be selected, for example, according to various parameters of wireless network such as the numbers of hops, environment noise etc., the buffer size for buffering data frames, and the processing capability of the egress network devices.

The example method 400 may comprise ordering, by the processor, the buffered data frames based on the sequence numbers, at 430.

The example method 400 may further comprise forwarding, by the processor, the ordered data frames to a client device based on the timestamps, in response to elapse of the time threshold, at 440.

In some examples, the processor may determine time intervals between two adjacent ordered data frames, and forward the ordered data frames based on the time intervals. In other examples, the processor may forward the ordered data frames to a client device according to any regular schedule, based on the timestamps.

Figure 5:
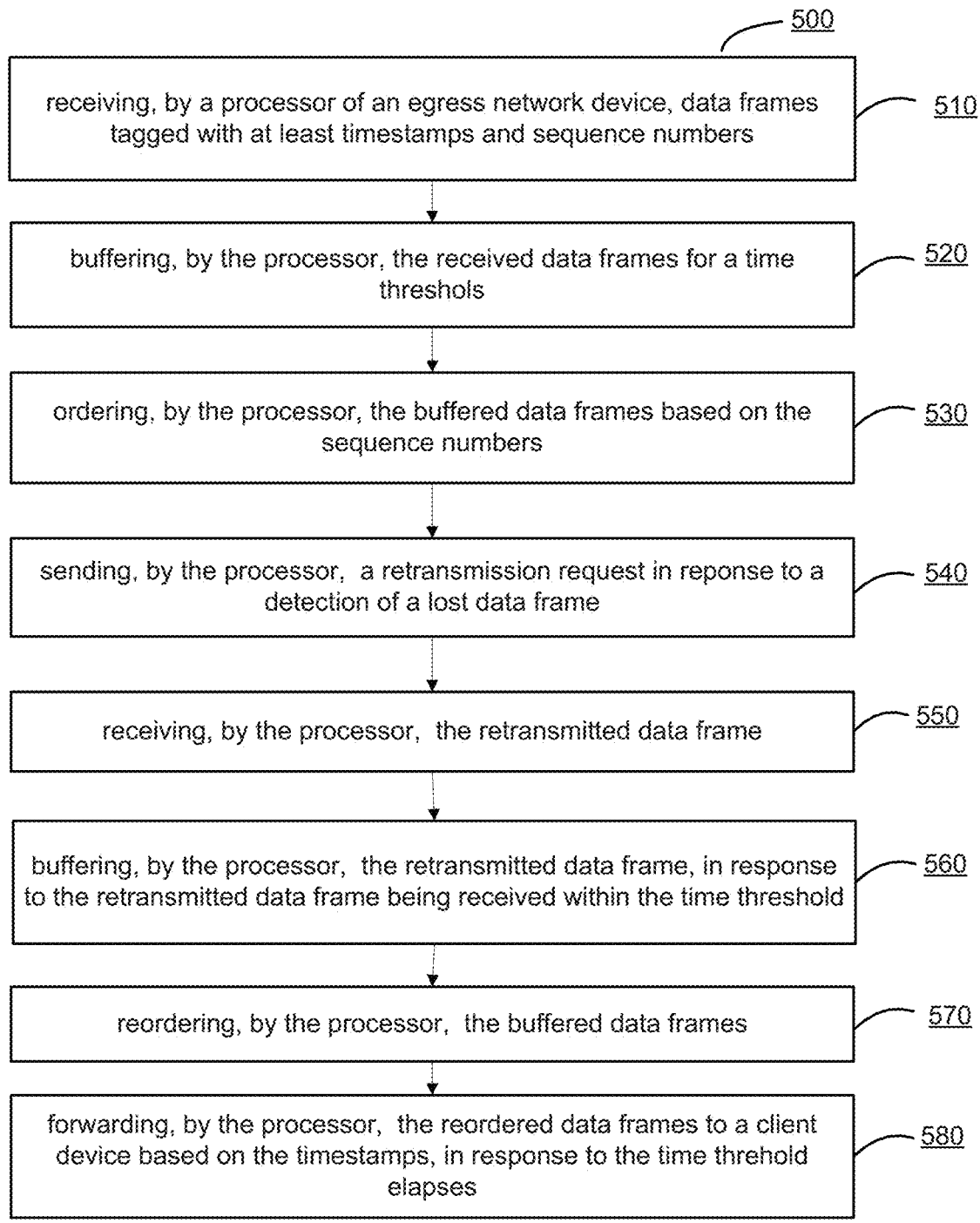
FIG. 5 is a flow chart illustrating another example method of data frame transmission according to the present disclosure.

FIG. 5 is a flow chart illustrating another example method 500 of data frame transmission according to the present disclosure. Referring to FIG. 5, the example method 500 may comprise: receiving, by a processor of the egress network device, data frames tagged with at least timestamps and sequence numbers, at 510; buffering, by the processor, the received data frames for a time threshold, at 520; and ordering, by the processor, the buffered data frames based on the sequence numbers, at 530.

In response to a detection of a lost data frame, the example method 500 may further comprises sending, by the processor, a retransmission request, at 540. The retransmission request may contain a sequence number of the lost data frame and/or any other suitable information that can identify the lost data frame. In response to receiving the retransmission request, the ingress network device 120 may retrieve the buffered data frames and retransmit the requested data frame.

The example method 500 may further comprise: receiving, by the processor, the retransmitted data frame, at 550; buffering, by the processor, the retransmitted data frame in response to receiving the retransmitted data frame within the time threshold, at 560; and reordering, by the processor, the buffered data frames, at 570.

In response to elapse of the time threshold, the example method 500 may also comprise forwarding, by the processor of the egress network device, the reordered data frames to a client device based on the timestamps, at 580.

In some examples, forwarding the reordered data frames may comprise: determining, by the processor, time intervals between two adjacent reordered data frames; and forwarding, by the processor, the reordered data frames based on the time intervals. In other examples, the reordered data frames may be forwarded to a client device according to any regular schedule, based on the timestamps.

Figure 6:
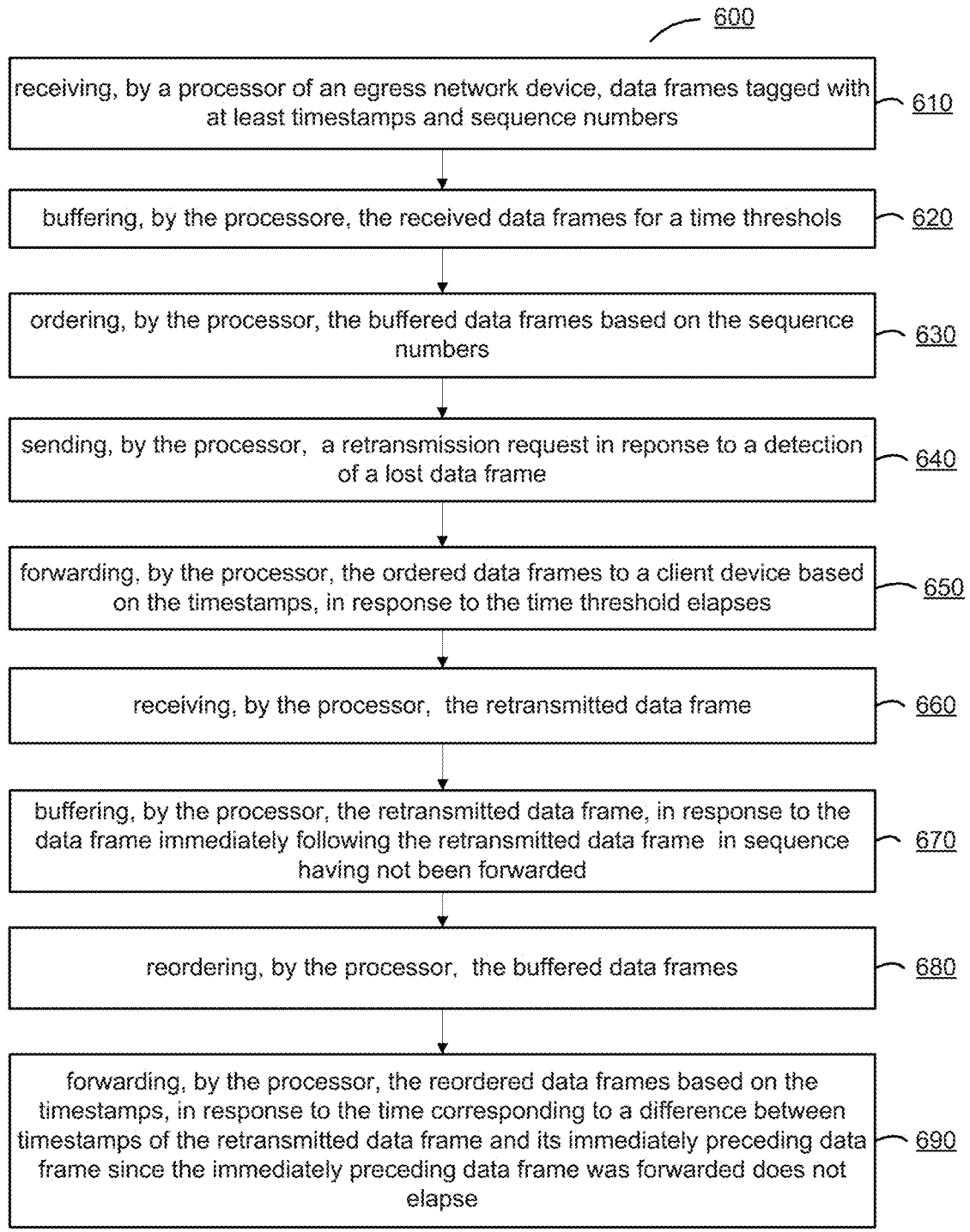
FIG. 6 is a flow chart illustrating another example method of data frame transmission according to the present disclosure.

FIG. 6 is a flow chart illustrating another example method 600 of data frame transmission according to the present disclosure. Referring to FIG. 6, the example method 600 may comprise: receiving, by a processor of the egress network device, data frames tagged with at least timestamps and sequence numbers, at 610; buffering, by the processor, the received data frames for a time threshold, at 620; and ordering, by the processor, the buffered data frames based on the sequence numbers, at 630.

In response to a detection of a lost data frame, the example method 600 may further comprise sending, by the processor, a retransmission request, at 640. The retransmission request may contain a sequence number of the lost data frame and/or any other suitable information that can identify the lost data frame. In response to receiving the retransmission request, the ingress network device 120 may retrieve the buffered data frames and retransmit the requested data frame.

Next, in response to the time threshold elapses, the example method 600 may also comprise forwarding, by the processor, the ordered data frames to a client device based on the timestamps, at 650.

The example method 600 may also comprise: receiving, by the processor, the retransmitted data frame, at 660; and buffering and reordering, by the processor, the retransmitted data frame, in response to the data frame immediately following the retransmitted data frame in sequence having not been forwarded, at 670 and 680, respectively.

The example method 600 may further comprise: forwarding, by the processor, the reordered data frames based on the timestamps, in response to the time corresponding to a difference between timestamps of the retransmitted data frame and its immediately preceding data frame since the immediately preceding data frame was forwarded does not elapse, at 690.

Figure 7:
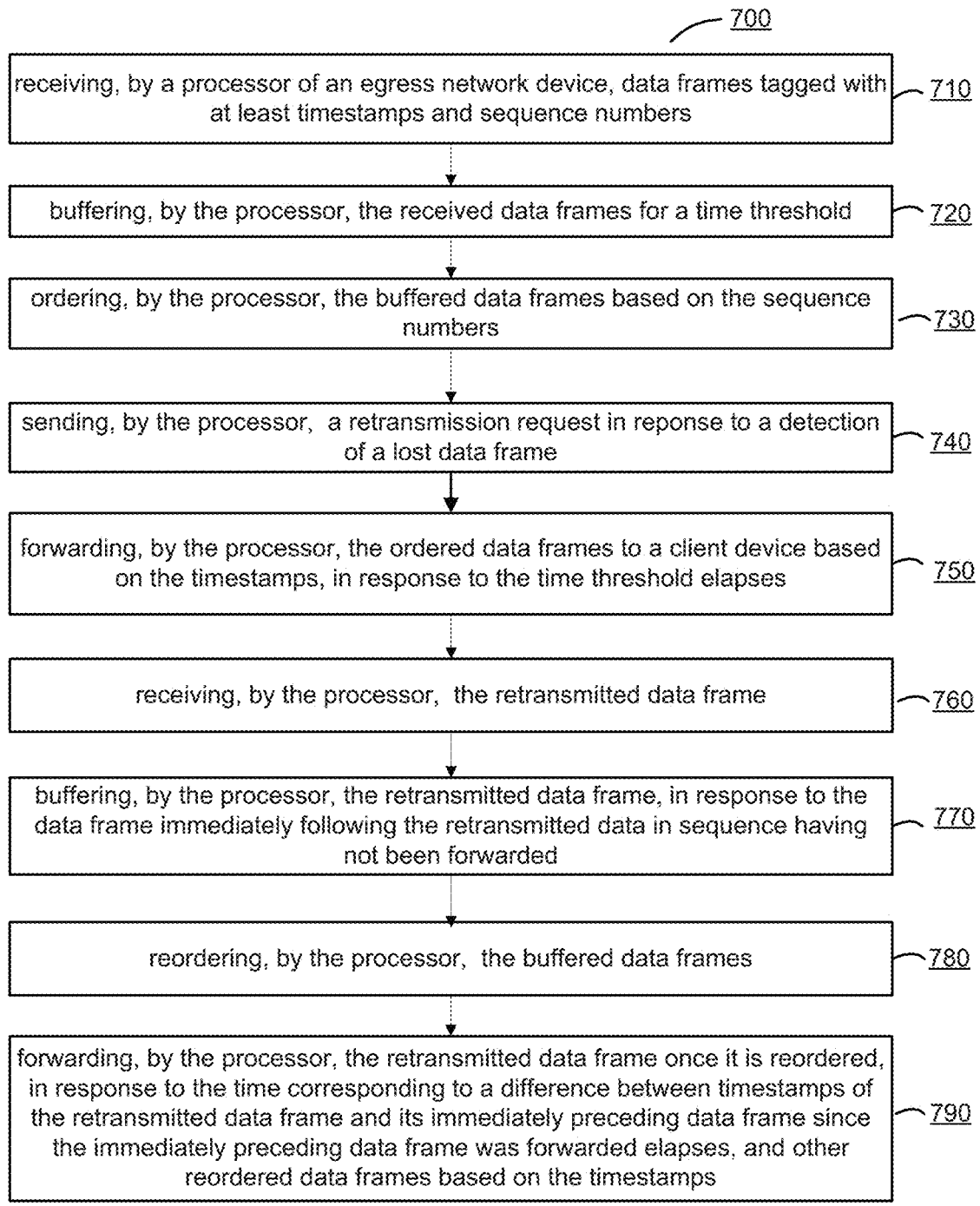
FIG. 7 is a flow chart illustrating yet another example method of data frame transmission according to the present disclosure.

FIG. 7 is a flow chart illustrating yet another example method 700 of data frame transmission according to the present disclosure. Referring to FIG. 7, the example method 700 may comprise: receiving, by a processor of the egress network device, data frames tagged with at least timestamps and sequence numbers, at 710; buffering, by the processor, the received data frames for a time threshold, at 720; and ordering, by the processor, the buffered data frames based on the sequence numbers, at 730.

In response to a detection of a lost data frame, the example method 700 may further comprise sending, by the processor, a retransmission request, at 740. The retransmission request may contain a sequence number of the lost data frame and/or any other suitable information that can identify the lost data frame. In response to receiving the retransmission request, the ingress network device 120 may retrieve the buffered data frames and retransmit the requested data frame.

Next, in response to elapse of the time threshold, the example method 700 may also comprise forwarding, by the processor, the ordered data frames to a client device based on the timestamps, at 750.

The example method 700 may also comprise: receiving, by the processor, the retransmitted data frame, at 760; and buffering and reordering, by the processor, the retransmitted data frame, in response to the data frame immediately following the retransmitted data frame in sequence having not been forwarded, at 770 and 780, respectively.

The example method 700 may further comprise forwarding, by the processor, the retransmitted data frames once it is reordered, in response to the time corresponding to a difference between timestamps of the retransmitted data frame and its immediately preceding data frame since the immediately preceding data frame was forwarded having elapsed, at 790. The other reordered data frames may be forwarded, by the processor, to the client device based on their timestamps.

In some example, the retransmitted data frame may be discarded by the processor of the egress network device in response to the data frame immediately following the retransmitted data frame in sequence having been forwarded.

Figure 8:
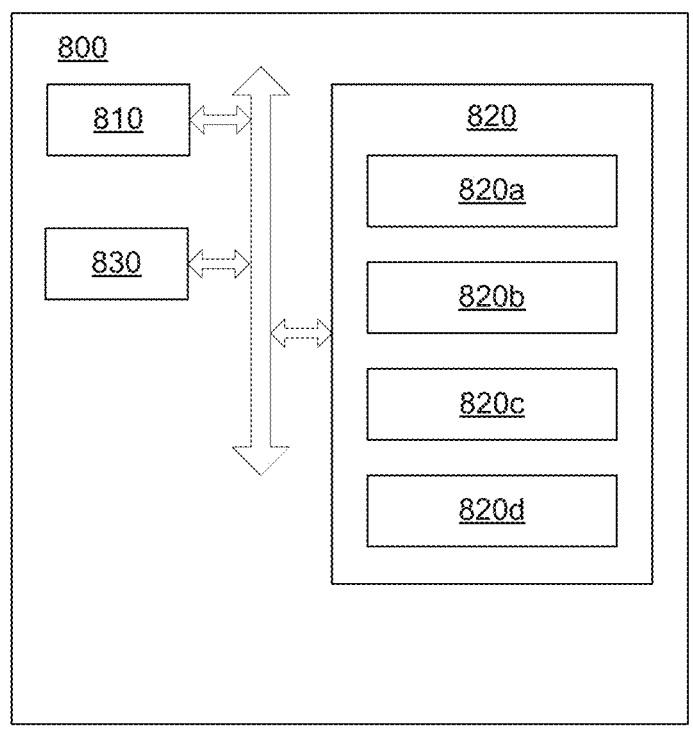
FIG. 8 is a block diagram illustrating an example egress network device according to the present disclosure.

FIG. 8 is a block diagram illustrating an example egress network device 800 according to the present disclosure. Referring to FIG. 8, the egress network device 800 may include a processor 810, a non-transitory computer readable storage medium 820, and a buffer 830.

The non-transitory computer readable storage medium 820 may store instructions executable for the processor 810. The buffer 830 may buffer the received data frames.

The instructions may include frame receiving instructions 820a that, when executed by the processor 810, may cause the processor 810 to receive data frames tagged with at least timestamps and sequence numbers.

The instructions may include frame buffering instructions 820b that, when executed by the processor 810, may cause the processor 810 to buffer the received data frames in the buffer 830 for a time threshold.

The instructions may include frame ordering instructions 820c that, when executed by the processor 810, may cause the processor 810 to order the buffered data frames based on the sequence numbers.

The instructions may further include frame forwarding instructions 820d that, when executed by the processor 810, may cause the processor 810 to forward the ordered data frames to a client device based on the timestamps, in response to elapse of the time threshold.

Figure 9:
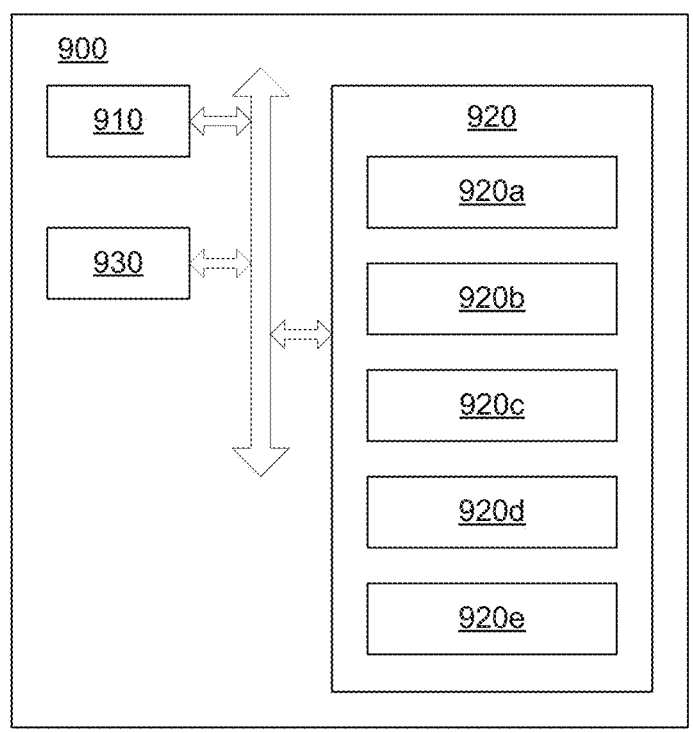
FIG. 9 is a block diagram illustrating another example egress network device according to the present disclosure.

FIG. 9 is a block diagram illustrating another example egress network device 900 according to the present disclosure. Referring to FIG. 9, the egress network device 900 may include a processor 910, a non-transitory computer readable storage medium 920, and a buffer 930.

The non-transitory computer readable storage medium 920 may store instructions executable for the processor 910. The buffer 930 may buffer the received data frames.

The instructions may include frame receiving instructions 920a that, when executed by the processor 910, may cause the processor 910 to receive data frames tagged with at least timestamps and sequence numbers.

The instructions may include frame buffering instructions 920b that, when executed by the processor 910, may cause the processor 910 to buffer the received data frames in the buffer 930 for a time threshold.

The instructions may include frame ordering instructions 920c that, when executed by the processor 910, may cause the processor 910 to order the buffered data frames based on the sequence numbers.

The instructions may include retransmission request instructions 920d that, when executed by the processor 910, may cause the processor 910 to send a retransmission request in response to a detection of a lost data frame. The retransmission request may contain a sequence number of the lost data frame and/or any other suitable information that can identify the lost data frame. In response to receiving the retransmission request, the ingress network device (e.g., the ingress network device 120) may retrieve the buffered data frames and retransmit the requested data frame.

The frame receiving instructions 920a, when executed by the processor 910, may also cause the processor 910 to receive the retransmitted data frame, and the frame buffering instructions 920b and frame ordering instructions 920c, when executed by the processor 910, may also cause the processor 910 to buffer the retransmitted data frame and to reorder the buffered data frames, respectively, in response to receiving the retransmitted data frame within the time threshold.

The instructions may further include frame forwarding instructions 920e that, when executed by the processor 910, may cause the processor 910 to forward the reordered data frames to a client device based on the timestamps, in response to elapse of the time threshold.

Figure 10:
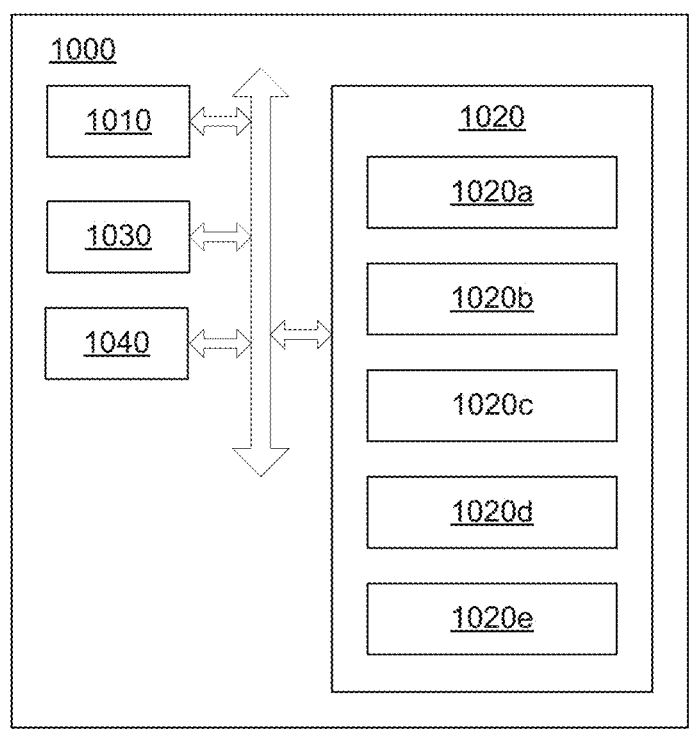
FIG. 10 is a block diagram illustrating yet another example egress network device according to the present disclosure.

FIG. 10 is a block diagram illustrating yet another example egress network device 1000 according to the present disclosure. Referring to FIG. 10, the network device 1000 may include a processor 1010, a non-transitory computer readable storage medium 1020, a buffer 1030, and a memory 1040.

The non-transitory computer readable storage medium 1020 may store instructions executable for the processor 1010. The buffer 1030 may buffer the received data frame. The memory 1040 may store a sequence number, a timestamp and/or other information about the latest data frame that has been forwarded to the client device.

The instructions may include frame receiving instructions 1020a that, when executed by the processor 1010, may cause the processor 1010 to receive data frames tagged with at least timestamps and sequence numbers.

The instructions may include frame buffering instructions 1020b that, when executed by the processor 1010, may cause the processor 1010 to buffer the received data frames in the buffer 1030 for a time threshold.

The instructions may include frame ordering instructions 1020c that, when executed by the processor 1010, may cause the processor 1010 to order the buffered data frames based on the sequence numbers.

The instructions may include retransmission request instructions 1020d that, when executed by the processor 1010, may cause the processor 1010 to send a retransmission request in response to a detection of a lost data frame. The retransmission request may contain a sequence number of the lost data frame and/or any other suitable information that can identify the lost data frame. In response to receiving the retransmission request, the ingress network device (e.g., the ingress network device 120) may retrieve the buffered data frames and retransmit the requested data frame.

The instructions may further include frame forwarding instructions 1020e that, when executed by the processor 1010, may cause the processor 1010 to forward the ordered data frames to a client device based on the timestamps, in response to elapse of the time threshold.

The frame receiving instructions 1020a, when executed by the processor 1010, may also cause the processor 1010 to receive the retransmitted data frame, and the frame buffering instructions 1020b and frame ordering instructions 1020c, when executed by the processor 1010, may also cause the processor 1010 to buffer the retransmitted data frame and to reorder the buffered data frames, respectively, in response to the data frame immediately following the retransmitted data frame in sequence having not been forwarded.

In response to the time corresponding to a difference between timestamps of the retransmitted data frame and its immediately preceding data frame since the immediately preceding data frame was forwarded does not elapse, the frame forwarding instructions 1020e, when executed by the processor 1010, may cause the processor 1010 to forward the reordered data frames to the client device based on the timestamps. Otherwise, in response to the time corresponding to a difference between timestamps of the retransmitted data frame and its immediately preceding data frame since the immediately preceding data frame was forwarded elapses, the frame forwarding instructions 1020e, when executed by the processor 1010, may cause the processor 1010 to forward the retransmitted data frame to the client device once it is reordered. In some example, the other reordered data frames may be forwarded based on the timestamps.

Although one lost data frame is described in the above examples, it is understood that, these examples are also applicable to an instance where a number of data frames loss, either by interval or in sequence.

While the present disclosure has been described in connection with certain example embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A method, comprising:
receiving, by a processor of a network device and from an ingress network device, data frames tagged with at least timestamps and sequence numbers, wherein the network device is an egress network device;
buffering, by the processor, the received data frames for a time threshold;
ordering, by the processor, the buffered data frames based on the sequence numbers;
sending, by the processor, a retransmission request to the ingress network device in response to a detection of a lost data frame;
receiving, by the processor, the retransmitted data frame;
buffering, by the processor, the retransmitted data frame in response to receiving the retransmitted data frame within the time threshold; and
reordering, by the processor, the buffered data frames;
forwarding, by the processor, the reordered data frames to a client device based on their timestamps, in response to elapse of the time threshold.

2. A network device comprising a processor to:
receive, from an ingress network device, data frames tagged with at least timestamps and sequence numbers, wherein the network device is an egress network device;
buffer the received data frames for a time threshold;
order the buffered data frames based on the sequence numbers;
send a retransmission request in response to a detection of a lost data frame;
receive the retransmitted data frame;
buffer the retransmitted data frame in response to receiving the retransmitted data frame within the time threshold; and
reorder the buffered data frames;
forward the reordered data frames to a client device based on their timestamps, in response to elapse of the time threshold.

3. A non-transitory computer readable storage medium storing instructions that, when executed by a processor of a network device, cause the processor to:
receive, from an ingress network device, data frames tagged with at least timestamps and sequence numbers, wherein the network device is an egress network device;
buffer the received data frames for a time threshold;
order the buffered data frames based on the sequence numbers;
send a retransmission request in response to a detection of a lost data frame;
receive the retransmitted data frame;
buffer the retransmitted data frame in response to receiving the retransmitted data frame within the time threshold; and
reorder the buffered data frames;
forward the ordered data frames to a client device based on their timestamps, in response to elapse of the time threshold.

* * * * *